United States Patent
Yati

(10) Patent No.: US 11,967,058 B2
(45) Date of Patent: Apr. 23, 2024

(54) SEMICONDUCTOR OVERLAY MEASUREMENTS USING MACHINE LEARNING

(71) Applicant: KLA Corporation, Milpitas, CA (US)

(72) Inventor: Arpit Yati, Lucknow (IN)

(73) Assignee: KLA Corporation, Milpitas, CA (US)

( * ) Notice: Subject to any disclaimer, the term of this patent is extended or adjusted under 35 U.S.C. 154(b) by 766 days.

(21) Appl. No.: 17/135,998

(22) Filed: Dec. 29, 2020

(65) Prior Publication Data
US 2021/0407073 A1    Dec. 30, 2021

Related U.S. Application Data

(60) Provisional application No. 63/063,973, filed on Aug. 11, 2020.

(30) Foreign Application Priority Data

Jun. 24, 2020 (IN) .............................. 202041026631

(51) Int. Cl.
  *G06T 7/00* (2017.01)
  *G06T 7/12* (2017.01)

(52) U.S. Cl.
  CPC .............. *G06T 7/0004* (2013.01); *G06T 7/12* (2017.01); *G06T 2207/10061* (2013.01); *G06T 2207/20081* (2013.01); *G06T 2207/30148* (2013.01)

(58) Field of Classification Search
  CPC .................... G06T 7/0004; G06T 7/12; G06T 2207/10061; G06T 2207/20081; G06T 2207/30148; G06T 2207/20084; G06F 18/2413; H01L 22/20
  See application file for complete search history.

(56) References Cited

U.S. PATENT DOCUMENTS

| | | | |
|---|---|---|---|
| 9,851,714 B2 * | 12/2017 | Dalla-Torre | ..... G05B 19/41875 |
| 9,978,558 B2 * | 5/2018 | Shimizu | ................. H01J 37/28 |
| 2008/0123108 A1 | 5/2008 | Cho et al. | |

(Continued)

FOREIGN PATENT DOCUMENTS

| | | |
|---|---|---|
| CN | 110647012 B | 4/2022 |
| CN | 109844918 B | 6/2023 |
| KR | 100834832 B1 | 6/2008 |

OTHER PUBLICATIONS

PCT/US2021/038563, International Search Report, dated Oct. 14, 2021.

(Continued)

*Primary Examiner* — Bobbak Safaipour

(74) *Attorney, Agent, or Firm* — Huse IP Law; Charles C. Huse

(57) ABSTRACT

An image of a portion of a semiconductor die is obtained that shows one or more structures in a first process layer and one or more structures in a second process layer. Using machine learning, a first region is defined on the image that at least partially includes the one or more structures in the first process layer. Also using machine learning, a second region is defined on the image that at least partially includes the one or more structures in the second process layer. An overlay offset between the one or more structures in the first process layer and the one or more structures in the second process layer is calculated using the first region and the second region.

26 Claims, 6 Drawing Sheets

(56) References Cited

U.S. PATENT DOCUMENTS

| | | |
|---|---|---|
| 2011/0155904 A1 | 6/2011 | Hotta et al. |
| 2013/0223723 A1 | 8/2013 | Shibahara et al. |
| 2016/0148850 A1* | 5/2016 | David .................. G03F 7/70633 355/53 |
| 2019/0026885 A1 | 1/2019 | Gready et al. |
| 2019/0378012 A1 | 12/2019 | Tripodi et al. |
| 2020/0111206 A1 | 4/2020 | Yati |
| 2020/0185281 A1 | 6/2020 | Leest et al. |
| 2022/0269184 A1* | 8/2022 | Lin .......................... G03F 7/705 |

OTHER PUBLICATIONS

PCT/US2021/038563, Written Opinion of the International Searching Authority, dated Oct. 14, 2021.
CN Appl. No. 202180042124.4, "First Office Action Issued by China National Intellectual Property Administration," Nov. 23, 2023.

* cited by examiner

SEMICONDUCTOR OVERLAY MEASUREMENTS USING MACHINE LEARNING

RELATED APPLICATION

This application claims priority to Indian Provisional Patent Application No. 202041026631, filed Jun. 24, 2020, and U.S. Provisional Patent Application No. 63/063,973, filed on Aug. 11, 2020, both of which are incorporated by reference in their entirety for all purposes.

TECHNICAL FIELD

This disclosure relates to measuring overlay (i.e., overlay offsets) for semiconductor devices, and more specifically to measuring overlay offsets using machine learning.

BACKGROUND

In semiconductor fabrication, misalignment between process layers causes unwanted shifts in the positions of structures in one process layer as compared to the positions of structures in another process layer. Such a shift (i.e., displacement) is referred to as overlay, or equivalently, as an overlay offset. Measuring these shifts is referred to as overlay metrology. Accurate overlay metrology is important for measuring process drift and thus for establishing and maintaining process control, especially during the ramp-up period for a new semiconductor process and/or device.

Scanning electron microscopes (SEMs) are useful tools for overlay metrology because they have high resolution and can image a structure regardless of its shape or size. Identifying structures (e.g., patterns of interest) in SEM images for overlay measurements presents significant challenges, however. Process variation can cause the shape, size, and orientation of structures to vary considerably, especially during the ramp-up period. As a result, traditional object-recognition algorithms may be unable to align on two structures for which overlap is to be measured.

SUMMARY

Overlay metrology may be performed by using machine learning to define regions corresponding to respective structures (or groups of structures) in respective process layers of a semiconductor die and using the regions to calculate an overlay offset between the structures.

In some embodiments, a method includes obtaining an image of a portion of a semiconductor die showing one or more structures in a first process layer and one or more structures in a second process layer. The method also includes using machine learning to define a first region on the image that at least partially includes the one or more structures in the first process layer and to define a second region on the image that at least partially includes the one or more structures in the second process layer. The method further includes using the first region and the second region to calculate an overlay offset between the one or more structures in the first process layer and the one or more structures in the second process layer.

In some embodiments, a non-transitory computer-readable storage medium stores one or more programs for execution by one or more processors. The one or more programs include instructions for performing the above method.

In some embodiments, a system includes a scanning electron microscope (SEM), one or more processors, and memory storing one or more programs for execution by the one or more processors. The one or more programs include instructions for performing the above method.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

A machine-learning classifier may be trained to define regions corresponding to respective structures, or groups of structures, in an image of a semiconductor die. For example, the image is a scanning-electron-microscope (SEM) image. The structures and/or groups of structures are fabricated in different process layers on the die. The regions are used to calculate an overlay offset between the structures.

Figure 1A:
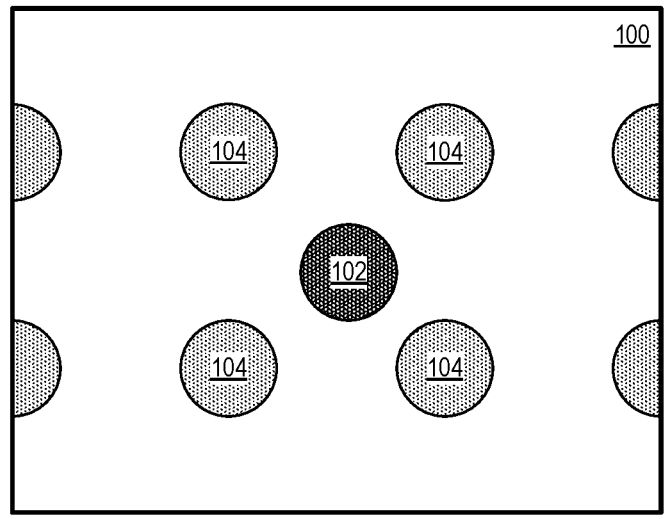
FIG. 1A is an illustration of a SEM image of a portion of a semiconductor die, showing a first structure in a first process layer and a plurality of second structures in a second process layer.

FIG. 1A is an illustration of a scanning-electron-microscope (SEM) image 100 of a portion of a semiconductor die. The SEM image 100 includes a structure 102 and a plurality of structures 104. The structure 102 and/or the plurality of structures 104 may be conductive (e.g., metal). For example, the structure 102 and/or the plurality of structures 104 may be conductive (e.g., metal) plugs. In some embodiments, the structure 102 is a via that conductively connects a first pair of metal layers and the structures 104 are vias that conductively connect a second pair of metal layers or are contacts that conductively connect a conductive layer (e.g., metal layer) to silicon. The structure 102 is in a different process layer of the semiconductor die than the plurality of structures 104. In some embodiments, the structure 102 is in a first via layer, while the plurality of structures 104 is in a second via layer (e.g., below the first via layer) or a contact layer. Other examples are possible.

Figure 1B:
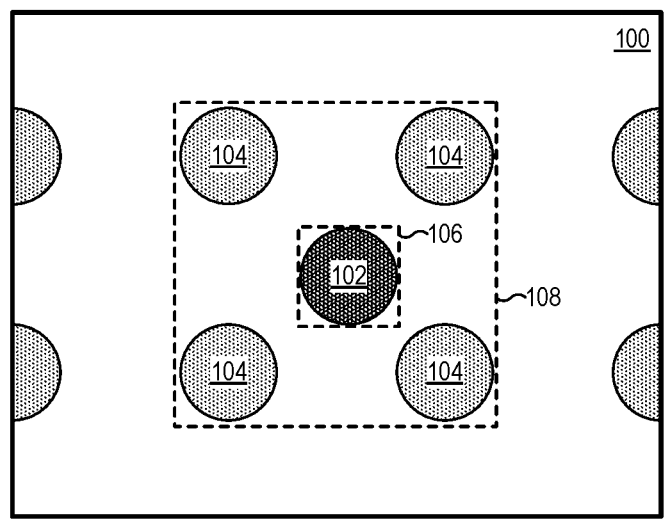
FIG. 1B is an illustration of the SEM image of FIG. 1A with a first region, defined using machine learning, that bounds the first structure in the first process layer and a second region, defined using machine learning, that bounds the plurality of second structures in the second process layer, in accordance with some embodiments.

In FIG. 1B, machine learning (e.g., a machine-learning classifier, which may be trained in accordance with step 502 of the method 500, below) has been used to define a first region 106 that corresponds to the structure 102 and a second region 108 that corresponds to the plurality of structures 104. In some embodiments, the first region 106 bounds the structure 102 and/or the second region 108 bounds the plurality of structures 104. The first region 106 thus may surround and enclose the structure 102, such that it entirely includes the structure 102, and the second region 108 may surround and enclose the plurality of structures 104, such that it entirely includes the plurality of structures 104. For example, the first region 106 may be a box (e.g., a rectangular box) that bounds the structure 102 and the second region 108 may be a box (e.g., a rectangular box) that bounds the plurality of structures 104. A box that is defined using machine learning to bound a structure or a plurality of structures is referred to as a bounding box. The first region 106 and/or second region 108 may alternatively be defined to have other shapes besides boxes.

The first region 106 and second region 108 may be used to calculate an overlay offset between the structure 102 and the plurality of structures 104. In some embodiments, a separation (e.g., in two dimensions in the plane of the SEM image 100, or in either the horizontal or vertical dimension of the plane of the SEM image 100) between the first region 106 and second region 108 is calculated to determine the overlay offset. For example, the overlay offset may be calculated as the distance between the center of the first region 106 and the center of the second region 108.

Figure 2A:
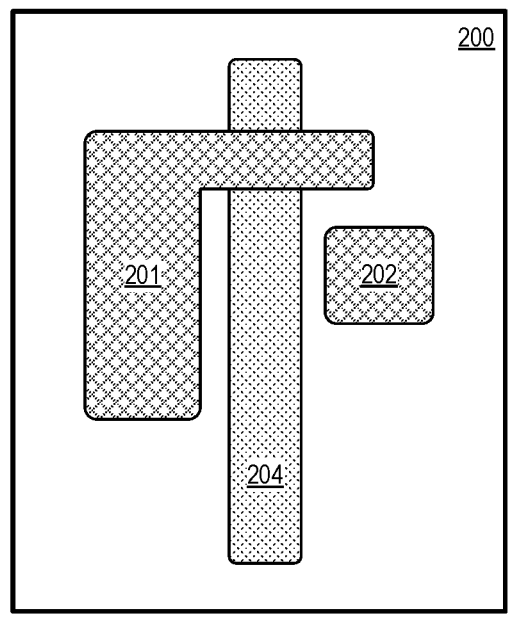
FIG. 2A is an illustration of another SEM image of a portion of a semiconductor die, showing structures in a first process layer and a structure in a second process layer.

FIG. 2A is an illustration of another SEM image 200 of a portion of a semiconductor die. The SEM image 200 includes a first structure 201 and a second structure 202 in a first process layer, along with a third structure 204 in a second process layer that is below the first process layer. The first structure 201 has an L-shape with horizontal and vertical arms, the second structure 202 is rectangular, and the third structure 204 is a line that runs beneath the horizontal arm of the first structure 201 and parallel to the vertical arm of the first structure 201. The third structure 204 runs vertically between the second structure 202 and the vertical arm of the first structure 201, but in a lower process layer than the process layer of the first structure 201 and second structure 202. In some embodiments, the first and second process layers are metal layers: the first structure 201 and second structure 202 are metal structures in a first metal layer, while the third structure 204 is a metal line in a second metal layer below the first metal layer. Other examples are possible.

Figure 2B:
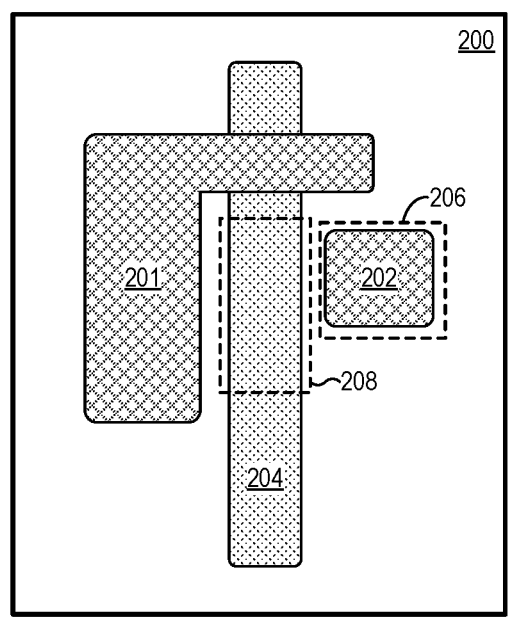
FIG. 2B is an illustration of the SEM image of FIG. 2A with a first region, defined using machine learning, that bounds one of the structures in the first process layer and a second region, defined using machine learning, that partially includes the structure in the second process layer, in accordance with some embodiments.

In FIG. 2B, machine learning (e.g., a machine-learning classifier, which may be trained in accordance with step 502 of the method 500, below) has been used to define a first region 206 that corresponds to the second structure 202 and a second region 208 that corresponds to the third structure 204. In some embodiments, the first region 206 bounds the second structure 202 and/or the second region 208 includes a portion of the third structure 204 (i.e., partially includes the third structure 204). For example, the first region 206 is a bounding box (e.g., a rectangular bounding box) that bounds the second structure 202 and/or the second region 208 is a box (e.g., a rectangular box) that encloses part of the third structure 204. The first region 206 and/or second region 208 may alternatively be defined to have other shapes besides boxes.

The first region 206 and second region 208 may be used to calculate an overlay offset between the second structure 202 and the third structure 204. In some embodiments, a separation (e.g., in the horizontal dimension of the SEM image 200) between the first region 206 and second region 208 is calculated to determine the overlay offset. For example, the overlay offset may be calculated as the distance (e.g., the horizontal distance) between the center of the first region 206 and the center of the second region 208.

FIGS. 1B and 2B show examples in which overlay offsets are calculated using the separation between regions that are defined using machine learning. Alternatively, regions that are defined using machine learning may be used as starting regions within which to detect the edges of structures, and overlay offsets are calculated using measured distances between detected edges.

Figure 3A:
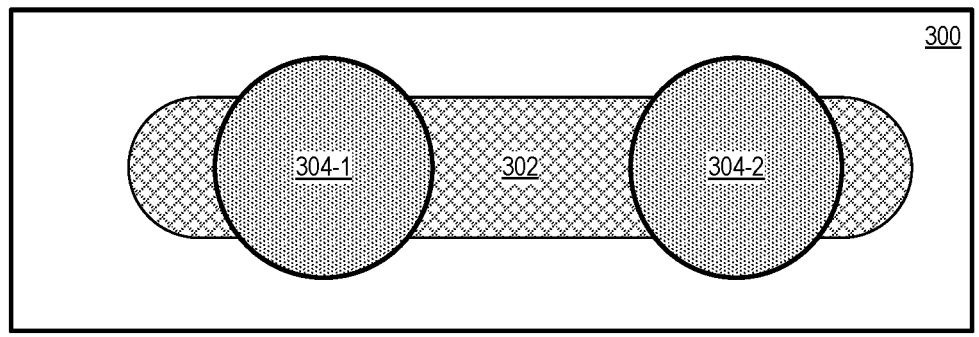
FIG. 3A is an illustration of yet another SEM image of a portion of a semiconductor die, showing a structure in a first process layer and a pair of structures in a second process layer.

FIG. 3A is an illustration of yet another SEM image 300 of a portion of a semiconductor die. The SEM image 300 includes a structure 302 in a first process layer and a pair of structures 304-1 and 304-2 in a second process layer. The structure 302 is a line (e.g., a metal line) with rounded corners. The structures 304-1 and 304-2 may be conductive plugs (e.g., conductive vias or contacts, which may be metal) that contact the structure 302. In some embodiments, the structures 304-1 and 304-2 may be metal vias in a via layer immediately above (or immediately below) the first process layer, which is a metal layer. Other examples are possible. The structures 304-1 and 304-2 are substantially circular in shape, although they may be elliptical to a degree (e.g., due to process variation).

Figure 3B:
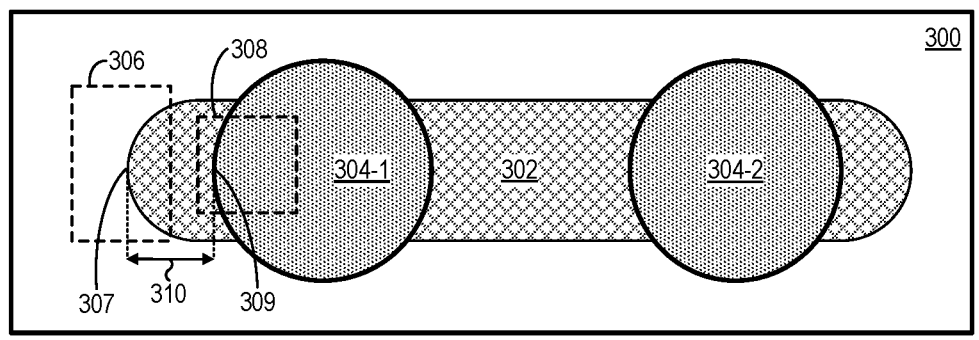
FIG. 3B is an illustration of the SEM image of FIG. 3A with a first region, defined using machine learning, that partially includes the structure in the first process layer and a second region, defined using machine learning, that partially includes a respective structure of the pair of structures in the second process layer, in accordance with some embodiments.

In FIG. 3B, machine learning (e.g., a machine-learning classifier, which may be trained in accordance with step 502 of the method 500, below) has been used to define a first region 306 that corresponds to and includes a portion of the structure 302 (i.e., partially includes the structure 302) and a second region 308 that corresponds to and includes a portion of the structure 304-1 (i.e., partially includes the structure 304-1). The first region 306 includes a portion of an edge 307 of the structure 302. In the example of FIG. 3B, the first region 306 includes an end of the structure 302, such that the portion of the edge 307 is at an end of the structure 302. The second region 308 includes a portion of an edge 309 of the structure 304-1. In the example of FIG. 3B, the second region 308 includes a portion of the circumference of the structure 304-1 (i.e., the portion of the edge 309 is a portion of the circumference of the structure 304-1). In some embodiments, the first region 306 and the second region 308 are boxes (e.g., rectangular boxes). The first region 306 and/or second region 308 may alternatively be defined to have other shapes besides boxes.

The first region 306 and second region 308 may be used to calculate an overlay offset between the structure 302 and the structure 304-1 by serving as starting regions within which to perform edge detection to detect the portions 307 and 309. Once the portions 307 and 309 have been respectively detected within the first region 306 and the second region 308, a distance 310 between them is calculated. The distance 310 gives the overlay offset between the structure 302 and the structure 304-1 (e.g., the overlay offset equals the distance 310 or equals the distance 310 plus a constant).

Figure 4A:
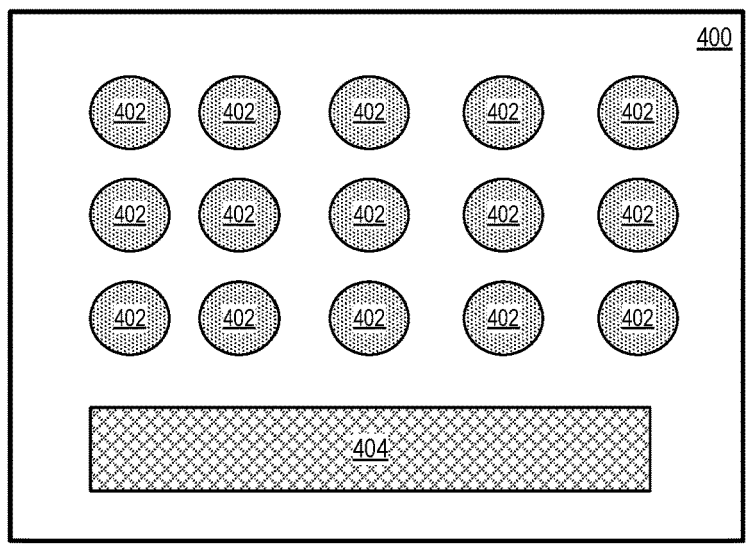
FIG. 4A is an illustration of still another SEM image of a portion of a semiconductor die, showing a plurality of structures in a first process layer and a structure in a second process layer.

FIG. 4A is an illustration of still another SEM image 400 of a portion of a semiconductor die. The SEM image 400 includes a plurality of structures 402 in a first process layer and a structure 404 in a second process layer. The structure 404 is a horizontal line (e.g., a metal line). The structures 402, which are arranged in an array, may be conductive plugs (e.g., conductive vias or contacts, which may be metal). In some embodiments, the structures 402 may be vias in a via layer or contacts in a contact layer. Other examples are possible. The structures 402 are substantially circular in shape, although they may be elliptical to a degree (e.g., due to process variation). The structures 402 are substantially evenly spaced, although their positions may vary to a degree from ideal evenly-spaced positions (e.g., due to process variation).

Figure 4B:
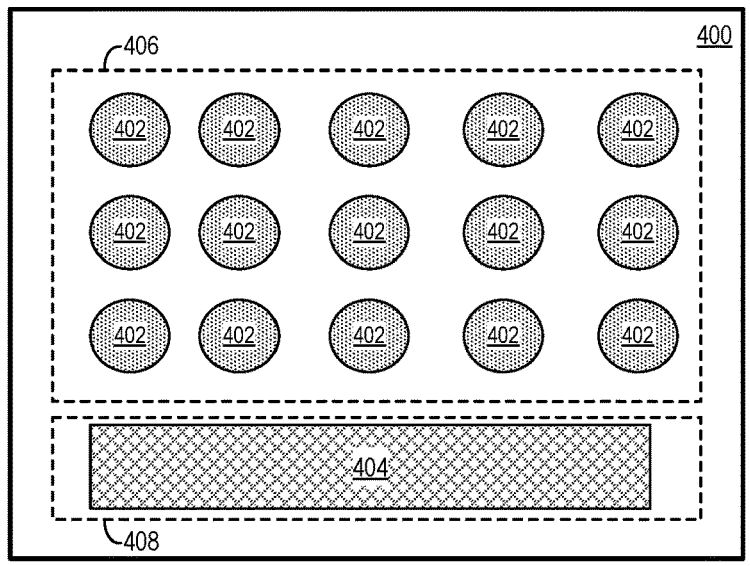
FIG. 4B is an illustration of the SEM image of FIG. 4A with a first region, defined using machine learning, that bounds the plurality of structures in the first process layer and a second region, defined using machine learning, that bounds the structure in the second process layer.

In FIG. 4B, machine learning (e.g., a machine-learning classifier, which may be trained in accordance with step 502 of the method 500, below) has been used to define a first region 406 that corresponds to the plurality of structures 402 and a second region 408 that corresponds to the structure 404. In some embodiments, the first region 406 bounds the plurality of structures 402, such that all of the structures 402 are within the first region 406 (i.e., the first region 406 includes all of the structures 402). In some embodiments, the second region 408 bounds the structure 404, such that the entirety of the structure 404 is within the second region 408 (i.e., the second region 408 includes the structure 404). For example, the first region 406 is a bounding box (e.g., a rectangular bounding box) that bounds the plurality of structures 402 and/or the second region 408 is a bounding box (e.g., a rectangular bounding box) that bounds the structure 404. The first region 406 and/or second region 408 may alternatively be defined to have other shapes besides boxes.

The first region 406 and second region 408 may be used to calculate an overlay offset between the plurality of structures 402 and the structure 404. In some embodiments, a separation (e.g., in two dimensions in the plane of the SEM image 400, or in either the vertical or horizontal dimension in the plane of the SEM image 400) between the first region 406 and second region 408 is calculated to determine the overlay offset. For example, the overlay offset may be calculated as the distance (or the distance plus a constant) between the center of the first region 406 and the center of the second region 408.

Figure 4C:
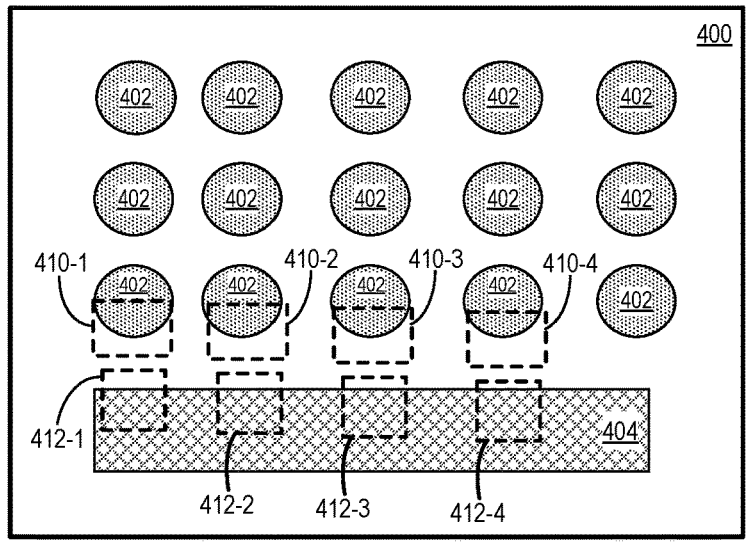
FIG. 4C is an illustration of the SEM image of FIG. 4A with multiple first regions, defined using machine learning, that partially include respective structures of the plurality of structures in the first process layer and multiple second regions, defined using machine learning, that partially include the structure in the second process layer.

In FIG. 4C, machine learning (e.g., a machine-learning classifier, which may be trained in accordance with step 502 of the method 500, below) has been used to define first regions 410-1 through 410-4 that correspond to and include respective portions of respective structures 402 of the plurality of structures 402 (e.g., respective structures 402 in the bottom row of the plurality of structures 402). Machine learning (e.g., the machine-learning classifier) has also been used to define second regions 412-1 through 412-4 that correspond to and include respective portions of the structure 404. Each of the first regions 410-1 through 410-4 includes a portion of an edge of a respective structure 402 (e.g., an edge portion facing the structure 404). Each of the second regions 412-1 through 412-4 includes a respective portion of an edge of the structure 404 (e.g., a portion of the top edge of the structure 404 across from a respective structure 402). In some embodiments, the first regions 410-1 through 410-4 and the second regions 412-1 through 412-4 are boxes (e.g., rectangular boxes). The first regions 410-1 through 410-4 and/or the second regions 412-1 through 412-4 may alternatively be defined to have other shapes besides boxes.

The first regions 410-1 through 410-4 and the second regions 412-1 through 412-4 may be used to calculate respective overlay offsets between respective structures 402 and the structure 404 by serving as starting regions within which to perform edge detection. Edge detection is performed to detect the edge portions in the first regions 410-1 through 410-4 and the second regions 412-1 through 412-4. Once these edge portions have been detected, distances between them are calculated: a first distance is calculated between the edge portion of a structure 402 in the first region 410-1 and the edge portion of the structure 404 in the second region 412-1, a second distance is calculated between the edge portion of a structure 402 in the first region 410-2 and the edge portion of the structure 404 in the second region 412-2, a third distance is calculated between the edge portion of a structure 402 in the first region 410-3 and the edge portion of the structure 404 in the second region 412-3, and a fourth distance is calculated between the edge portion of a structure 402 in the first region 410-4 and the edge portion of the structure 404 in the second region 412-4. (While four first regions 410 and four second regions 412 are shown in the example of FIG. 4C, other numbers of regions are possible.) These distances, which may be calculated by analogy to the distance 310 (FIG. 3B), give respective overlay offsets between respective structures 402 and the structure 404 (e.g., the overlay offsets equal respective distances or equal respective distances plus a constant). An average overlay offset between the plurality of structures 402 and the structure 404 may be determined using an average of these distances.

Figure 5:
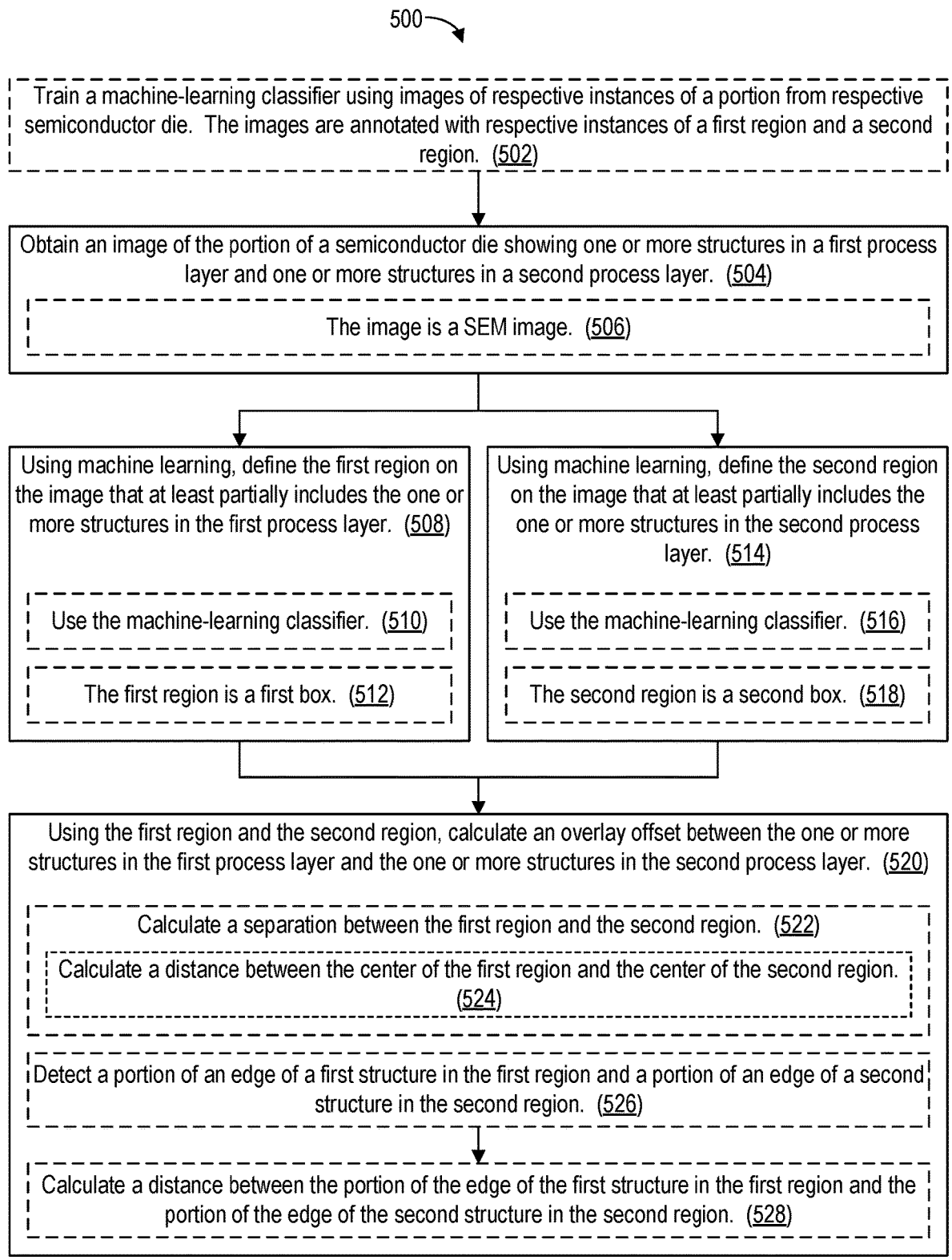
FIG. 5 is a flowchart showing an overlay-metrology method in accordance with some embodiments.

FIG. 5 is a flowchart showing an overlay-metrology method 500 in accordance with some embodiments. The method 500 may be performed by a computer system (e.g., the computer system of the semiconductor inspection system 600, FIG. 6).

In some embodiments, a machine-learning classifier is trained (502) using images of respective instances of a die portion from respective semiconductor die. The images are annotated with respective instances of a first region and a second region. For example, the images have been annotated by a user using a graphical drawing program to indicate the respective instances of the first region and the second region.

In some embodiments, the machine-learning classifier is a neural network. For example, the machine-learning classifier is a convolutional neural network (CNN) (e.g., a Mask-R-CNN). Alternatively, the machine-learning classifier may be a different type of neural network or a different type of machine-learning classifier besides a neural network.

An image is obtained (504) of a portion of a semiconductor die showing one or more structures in a first process layer and one or more structures in a second process layer. In some embodiments, the image is (506) a SEM image. The image may be obtained directly from an imaging tool (e.g., the SEM 632, FIG. 6) or may be obtained from a memory in which the image was previously stored. Examples of the image include, without limitation, the image 100 (FIG. 1A), the image 200 (FIG. 2A), the image 300 (FIG. 3A), or the image 400 (FIG. 4A).

Using machine learning, a first region is defined (508) on the image that at least partially includes the one or more structures in the first process layer. In some embodiments, the first region is defined using (510) the machine-learning classifier trained in step 502. The first region may be (512) a first box (e.g., a rectangular box). For example, the first box is a bounding box (e.g., region 106, FIG. 1B; region 206, FIG. 2B; region 406, FIG. 4B) that bounds the one or more structures in the first process layer. Alternatively, the first region may include a portion of an edge (i.e., only the portion of the edge, and not the entire edge) of a first structure that is one of the one or more structures in the first process layer. For example, the first region may be a first box (e.g., a rectangular box) (e.g., region 306, FIG. 3B; one of the regions 410-1 through 410-4, FIG. 4C) that includes the portion of the edge of the first structure.

Also using machine learning, a second region is defined (514) on the image that at least partially includes the one or more structures in the second process layer. In some embodiments, the second region is defined using (516) the machine-learning classifier trained in step 502. The second region may be (518) a second box (e.g., a rectangular box). For example, the second box is a bounding box (e.g., region 108, FIG. 1B; region 408, FIG. 4B) that bounds the one or more structures in the second process layer. Alternatively, the second region (e.g., region 208, FIG. 2B; region 308, FIG. 3B; one of the regions 412-1 through 412-4, FIG. 4C) may include a portion of an edge (i.e., only the portion of the edge, and not the entire edge) of a second structure that is one of the one or more structures in the second process layer. For example, the second region may be a second box (e.g., a rectangular box) that includes the portion of the edge of the second structure.

In some embodiments, the machine-learning of steps 508 and 514 is implemented using a neural network. For example, a convolutional neural network (CNN) (e.g., a Mask-R-CNN) is used. In other embodiments, a different type of machine-learning classifier is used to implement the machine-learning of steps 508 and 514.

Using the first region and the second region, an overlay offset between the one or more structures in the first process layer and the one or more structures in the second process layer is calculated (520).

In some embodiments, to calculate the overlay offset, a separation is calculated (522) between the first region and the second region (e.g., as described for FIGS. 1B, 2B, and 4B). For example, a distance between the center of the first region and the center of the second region is calculated (524). The distance may be in a particular direction (e.g., may be a vector difference). The distance may be in two dimensions in the plane of the image, or in either the vertical or horizontal dimension in the plane of the image.

In some embodiments, to calculate the overlay offset, a portion of an edge of a first structure in the first region and a portion of an edge of a second structure in the second region are detected (526). The first structure is one of the one or more structures in the first process layer and the second structure is one of the one or more structures in the second process layer. These edge portions are detected by applying an edge-detection algorithm to the first region and the second region. The first region and the second region thus may serve as respective search regions within which to perform edge detection (i.e., within which to search for edges). A distance (e.g., distance 310, FIG. 3B) between the portion of the edge of the first structure in the first region and the portion of the edge of the second structure in the second region is calculated (528) (e.g., as described for FIGS. 3B and 4C).

The method 500, with its use of machine learning to define regions, provides a more robust approach to overlay metrology than techniques that use traditional object-recognition algorithms. The method 500 thus allows overlay metrology to be performed successfully and accurately in situations in which process variations causes techniques that use traditional object-recognition algorithms to fail.

The overlay offset may be used to identify process changes for establishing or improving process control. The overlay offset may also, or alternatively, be used to disposition a wafer. For example, the decision whether to continue to process, rework, or scrap a wafer may be based in whole or in part on overlay offsets for semiconductor die on the wafer.

Figure 6:
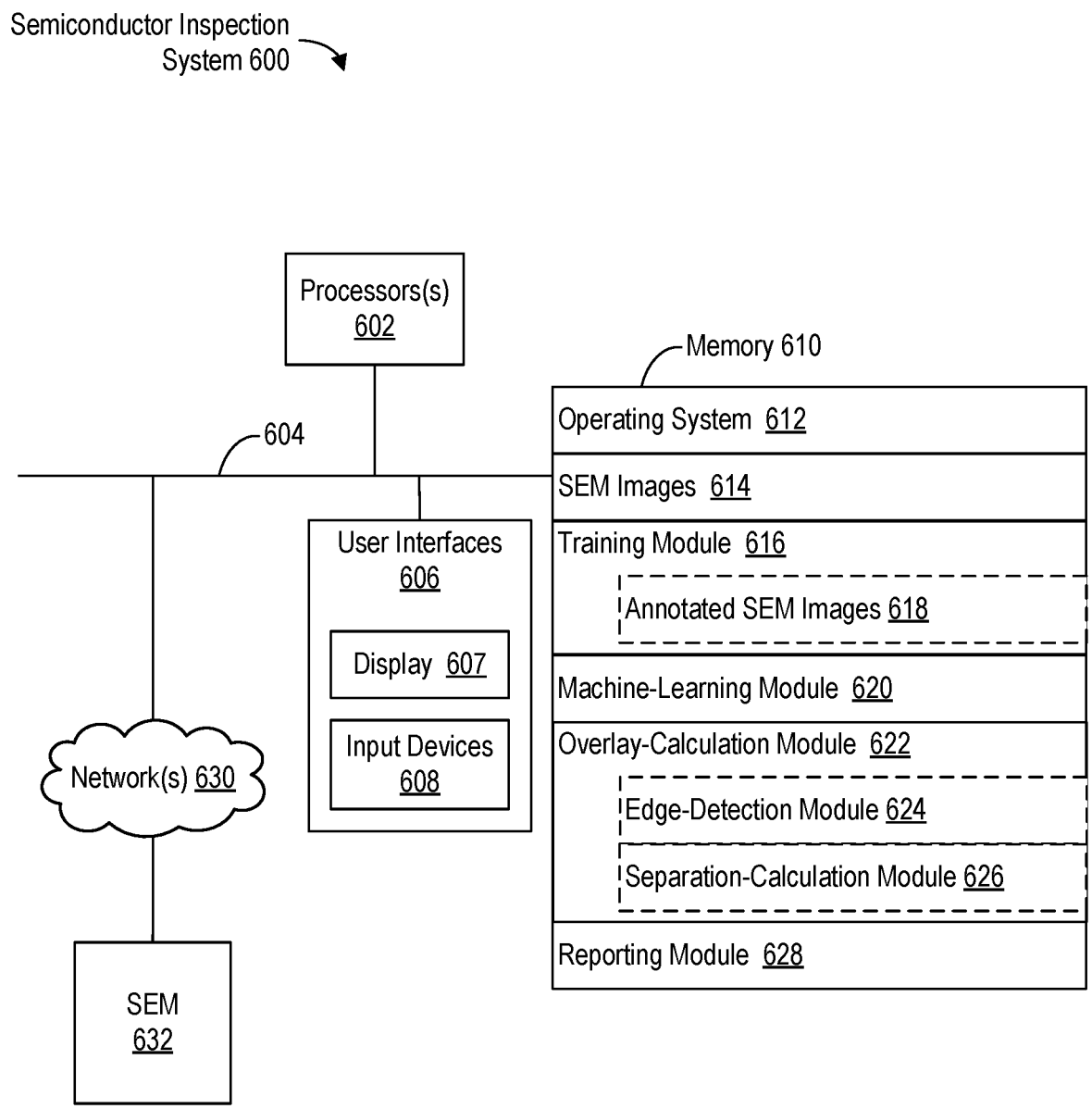
FIG. 6 is a block diagram of a semiconductor inspection system in accordance with some embodiments.

FIG. 6 is a block diagram of a semiconductor inspection system 600 in accordance with some embodiments. The semiconductor inspection system 600 may be used for overlay metrology (e.g., for performing the overlay-metrology method 500, FIG. 5). The semiconductor inspection system 600 includes a SEM 632 (or other imaging tool) and a computer system with one or more processors 602 (e.g., CPUs and/or GPUs), user interfaces 606, memory 610, and communication bus(es) 604 interconnecting these components. In some embodiments, the SEM 632 is communicatively coupled to the computer system through one or more wired and/or wireless networks 630. In some embodiments, the semiconductor inspection system 600 includes multiple SEMs 632 (or other imaging tools) communicatively coupled with the computer system (e.g., through the one or more wired and/or wireless networks 630).

The user interfaces 606 may include a display 607 and one or more input devices 608 (e.g., a keyboard, mouse, touch-sensitive surface of the display 607, etc.). The display 607 may display results, including overlay offsets and/or regions defined using machine learning (e.g., the first and second regions defined in the method 500, FIG. 5).

Memory 610 includes volatile and/or non-volatile memory. Memory 610 (e.g., the non-volatile memory within memory 610) includes a non-transitory computer-readable storage medium. Memory 610 optionally includes one or more storage devices remotely located from the processors 602 and/or a non-transitory computer-readable storage medium that is removably inserted into the computer system of the semiconductor inspection system 600.

In some embodiments, memory 610 (e.g., the non-transitory computer-readable storage medium of memory 610) stores the following modules and data, or a subset or superset thereof: an operating system 612 that includes procedures for handling various basic system services and for performing hardware-dependent tasks, images 614 (e.g., SEM images) for which overlay offsets are to be calculated, a training module 616 for training a machine-learning classifier (e.g., per step 502 of the method 500, FIG. 5), a machine-learning module 620 for defining regions on the images 614 (e.g., per steps 508 and 514 of the method 500, FIG. 5) (e.g., using the machine-learning classifier trained by the training module 616), an overlay calculation module 622 for calculating overlay offsets (e.g., per step 520 of the method 500, FIG. 5), and a reporting module 628 for reporting results (e.g., for displaying results on the display 607). In some embodiments, the training module 616 includes annotated images 618 (e.g., annotated SEM images) that are used to train the machine-learning classifier. In some embodiments, the training module 616 is absent and the machine-learning module 620 uses a machine-learning classifier trained on a different computer system. In some embodiments, the overlay calculation module 622 includes an edge-detection module 624 for detecting edges in defined regions (e.g., per step 526 of the method 500, FIG. 5) and/or a separation-calculation module 626 for calculating separations between defined regions (e.g., per step 522 of the method 500, FIG. 5) and/or distances between detected edges (e.g., per step 528 of the method 500, FIG. 5). The memory 610 (e.g., the non-transitory computer-readable storage medium of the memory 610) may include instructions for performing all or a portion of the method 500 (FIG. 5).

Each of the modules stored in the memory 610 corresponds to a set of instructions for performing one or more functions described herein. Separate modules need not be implemented as separate software programs. The modules and various subsets of the modules may be combined or otherwise re-arranged. In some embodiments, the memory 610 stores a subset or superset of the modules and/or data structures identified above.

FIG. 6 is intended more as a functional description of various features that may be present in a semiconductor inspection system than as a structural schematic. For example, the functionality of the computer system in the semiconductor inspection system 600 may be split between multiple devices. A portion of the modules stored in the memory 610 may alternatively be stored in one or more other computer systems communicatively coupled with the computer system of the semiconductor inspection system 600 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
obtaining an image of a portion of a semiconductor die showing one or more structures in a first process layer and one or more structures in a second process layer;
using machine learning, defining a first region on the image that at least partially includes the one or more structures in the first process layer;
using machine learning, defining a second region on the image that at least partially includes the one or more structures in the second process layer; and
using the first region and the second region, calculating an overlay offset between the one or more structures in the first process layer and the one or more structures in the second process layer.

2. The method of claim 1, wherein the image is a scanning electron microscope (SEM) image.

3. The method of claim 1, wherein calculating the overlay offset using the first region and the second region comprises calculating a separation between the first region and the second region.

4. The method of claim 3, wherein calculating the separation between the first region and the second region comprises calculating a distance between the center of the first region and the center of the second region.

5. The method of claim 3, wherein:
the first region is a first box; and
the second region is a second box.

6. The method of claim 5, wherein:
the first box bounds the one or more structures in the first process layer; and
the second box bounds the one or more structures in the second process layer.

7. The method of claim 1, wherein:
the one or more structures in the first process layer comprise a first structure;
the one or more structures in the second process layer comprise a second structure;
the first region includes a portion of an edge of the first structure;
the second region includes a portion of an edge of the second structure; and
calculating the overlay offset using the first region and the second region comprises:
detecting the portion of the edge of the first structure in the first region,
detecting the portion of the edge of the second structure in the second region, and
calculating a distance between the portion of the edge of the first structure in the first region and the portion of the edge of the second structure in the second region.

8. The method of claim 7, wherein:
the first region is a first box; and
the second region is a second box.

9. The method of claim 1, wherein:
defining the first region and defining the second region are performed using a machine-learning classifier; and
the method further comprises training the machine-learning classifier using images of respective instances of the portion from respective semiconductor die, the images being annotated with respective instances of the first region and the second region.

10. A non-transitory computer-readable storage medium storing one or more programs for execution by one or more processors, the one or more programs comprising instructions for:
obtaining an image of a portion of a semiconductor die showing one or more structures in a first process layer and one or more structures in a second process layer;
using machine learning, defining a first region on the image that at least partially includes the one or more structures in the first process layer;

using machine learning, defining a second region on the image that at least partially includes the one or more structures in the second process layer; and using the first region and the second region, calculating an overlay offset between the one or more structures in the first process layer and the one or more structures in the second process layer.

11. The computer-readable storage medium of claim 10, wherein the image is a scanning electron microscope (SEM) image.

12. The computer-readable storage medium of claim 10, wherein the instructions for calculating the overlay offset using the first region and the second region comprise instructions for calculating a separation between the first region and the second region.

13. The computer-readable storage medium of claim 12, wherein the instructions for calculating the separation between the first region and the second region comprise instructions for calculating a distance between the center of the first region and the center of the second region.

14. The computer-readable storage medium of claim 12, wherein:
the first region is a first box; and
the second region is a second box.

15. The computer-readable storage medium of claim 14, wherein:
the first box bounds the one or more structures in the first process layer; and
the second box bounds the one or more structures in the second process layer.

16. The computer-readable storage medium of claim 10, wherein:
the one or more structures in the first process layer comprise a first structure;
the one or more structures in the second process layer comprise a second structure;
the first region includes a portion of an edge of the first structure;
the second region includes a portion of an edge of the second structure; and
the instructions for calculating the overlay offset using the first region and the second region comprise instructions for:
detecting the portion of the edge of the first structure in the first region,
detecting the portion of the edge of the second structure in the second region, and
calculating a distance between the portion of the edge of the first structure in the first region and the portion of the edge of the second structure in the second region.

17. The computer-readable storage medium of claim 16, wherein:
the first region is a first box; and
the second region is a second box.

18. The computer-readable storage medium of claim 10, wherein:
the instructions for defining the first region and defining the second region comprise instructions for using a machine-learning classifier to define the first region and the second region; and
the one or more programs further comprise instructions for training the machine-learning classifier using images of respective instances of the portion from respective semiconductor die, the images being annotated with respective instances of the first region and the second region.

19. A system, comprising:
a scanning electron microscope (SEM);
one or more processors; and
memory storing one or more programs for execution by the one or more processors, the one or more programs comprising instructions for:
obtaining, from the SEM, a SEM image of a portion of a semiconductor die showing one or more structures in a first process layer and one or more structures in a second process layer;
using machine learning, defining a first region on the SEM image that at least partially includes the one or more structures in the first process layer;
using machine learning, defining a second region on the SEM image that at least partially includes the one or more structures in the second process layer; and
using the first region and the second region, calculating an overlay offset between the one or more structures in the first process layer and the one or more structures in the second process layer.

20. The system of claim 19, wherein the instructions for calculating the overlay offset using the first region and the second region comprise instructions for calculating a separation between the first region and the second region.

21. The system of claim 20, wherein the instructions for calculating the separation between the first region and the second region comprise instructions for calculating a distance between the center of the first region and the center of the second region.

22. The system of claim 20, wherein:
the first region is a first box; and
the second region is a second box.

23. The system of claim 22, wherein:
the first box bounds the one or more structures in the first process layer; and
the second box bounds the one or more structures in the second process layer.

24. The system of claim 19, wherein:
the one or more structures in the first process layer comprise a first structure;
the one or more structures in the second process layer comprise a second structure;
the first region includes a portion of an edge of the first structure;
the second region includes a portion of an edge of the second structure; and
the instructions for calculating the overlay offset using the first region and the second region comprise instructions for:
detecting the portion of the edge of the first structure in the first region,
detecting the portion of the edge of the second structure in the second region, and
calculating a distance between the portion of the edge of the first structure in the first region and the portion of the edge of the second structure in the second region.

25. The system of claim 24, wherein:
the first region is a first box; and
the second region is a second box.

26. The system of claim 19, wherein:
the instructions for defining the first region and defining the second region comprise instructions for using a machine-learning classifier to define the first region and the second region; and
the one or more programs further comprise instructions for training the machine-learning classifier using SEM images of respective instances of the portion from respective semiconductor die, the SEM images being annotated with respective instances of the first region and the second region.

\* \* \* \* \*